United States Patent [19]
Hutchison et al.

[11] Patent Number: 6,071,455
[45] Date of Patent: Jun. 6, 2000

[54] PROCESS FOR MAKING A THERMOPLASTIC STRUCTURAL PIECE CONTAINING INJECTION MOLDED PORTION

[75] Inventors: Herbert Hutchison, Gahanna; Paul R. Pelfrey, Pickerington; Byron Rose, Williamsport, all of Ohio

[73] Assignee: Crane Plastics Company Limited Partnership, Columbus, Ohio

[21] Appl. No.: 09/161,974

[22] Filed: Sep. 28, 1998

Related U.S. Application Data

[63] Continuation of application No. 08/582,458, Jan. 3, 1996, Pat. No. 5,814,391, which is a continuation of application No. 08/343,716, Nov. 22, 1994, abandoned.

[51] Int. Cl.[7] .................................................. B29D 27/04
[52] U.S. Cl. .......................... 264/251; 264/254; 264/261; 264/297.2; 264/297.8
[58] Field of Search .................................. 264/254, 277, 264/297.1, 297.2, 297.8, 261, 250, 255, 328.8; 428/195, 57, 58, 192, 212, 411.1, 500

[56] References Cited

U.S. PATENT DOCUMENTS

| | | | |
|---|---|---|---|
| 3,786,171 | 1/1974 | Shira | 52/220 |
| 3,893,777 | 7/1975 | Jones | 264/261 |
| 4,318,764 | 3/1982 | Van Manen | 156/244 |
| 4,372,901 | 2/1983 | Kim | 264/261 |
| 4,617,209 | 10/1986 | Ives | 428/31 |
| 4,619,847 | 10/1986 | Jackson | 428/31 |
| 4,719,067 | 1/1988 | Thiel | 264/259 |
| 4,778,550 | 10/1988 | Barton et al. | 156/211 |
| 4,874,651 | 10/1989 | Takai | 428/81 |
| 4,911,873 | 3/1990 | Kuzuya et al. | 264/148 |
| 4,978,490 | 12/1990 | Jackson | 264/148 |
| 5,059,476 | 10/1991 | Steiniger et al. | 428/53 |
| 5,227,108 | 7/1993 | Reid, Jr. et al. | 264/148 |
| 5,250,241 | 10/1993 | Iwasa et al. | 264/252 |
| 5,536,343 | 7/1996 | Kuse | 264/252 |
| 5,770,133 | 6/1998 | Boutaghou | 264/261 |
| 5,810,956 | 9/1998 | Tanis et al. | 264/261 |

*Primary Examiner*—Angela Ortiz
*Attorney, Agent, or Firm*—Standley & Gilcrest LLP

[57] ABSTRACT

A process is disclosed for manufacturing a thermoplastic panel or piece having a resilient injection molded portion. The panel or piece of the present invention may be used in a variety of applications such as to provide sealing ends on thermoplastic panels or to create resiliently closeable passages in thermoplastic panels through which wires and other objects may be passed while maintaining an even surface appearance of the baseboard panel. Other uses include attaching one or more thermoplastic pieces together.

2 Claims, 5 Drawing Sheets

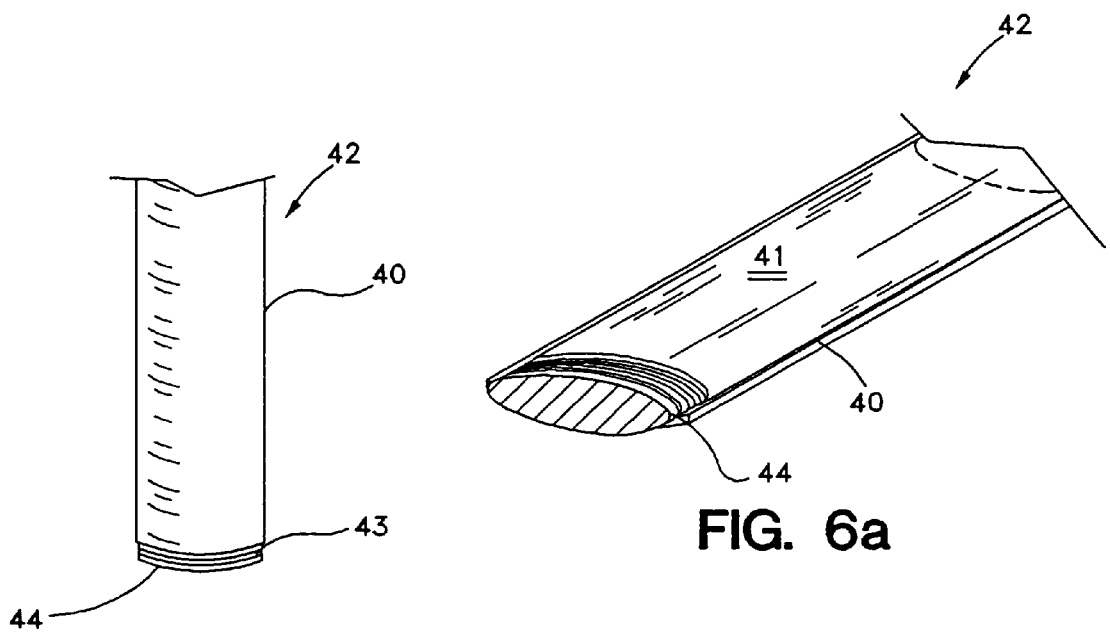
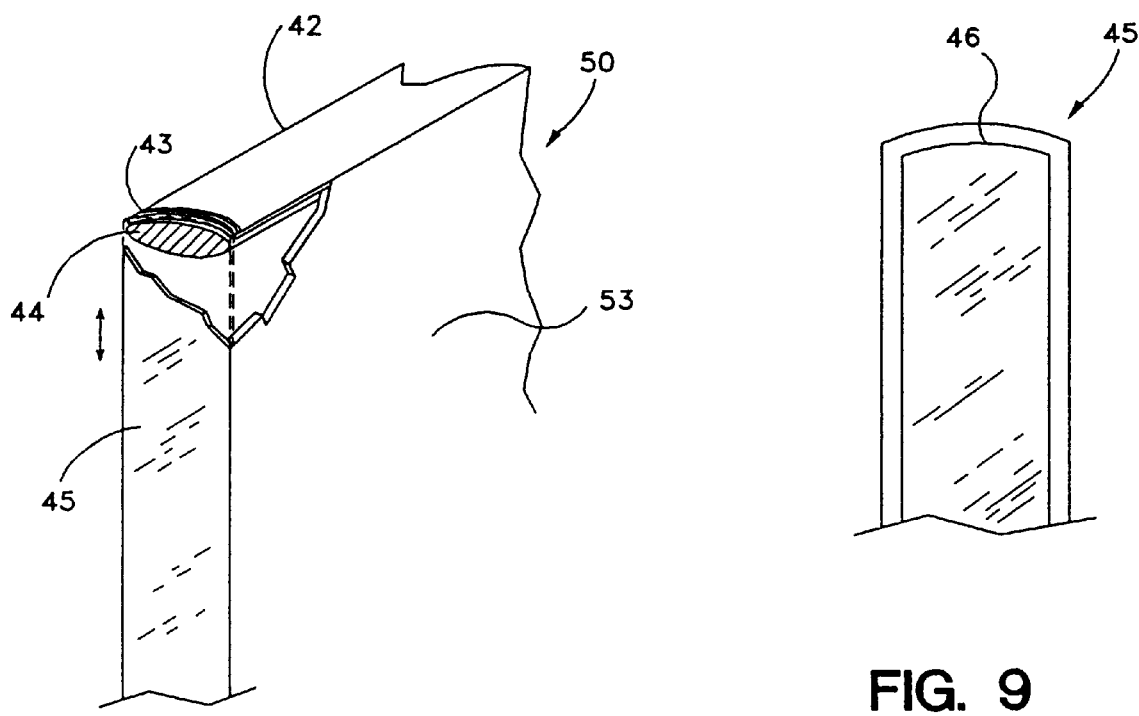

PROCESS FOR MAKING A THERMOPLASTIC STRUCTURAL PIECE CONTAINING INJECTION MOLDED PORTION

This application is a continuation application under 37 CFR 1.53(b) of prior application Ser. No. 08/582,458, filed on Jan. 3, 1996, now U.S. Pat. No. 5,814,391; which is a continuation of application Ser. No. 08/343,716, filed Nov. 22, 1994, now abandoned.

BACKGROUND

1. Technical Field

The present invention is a thermoplastic panel or piece having a resilient injection molded portion. The panel or piece of the present invention may be used in a variety of applications such as to provide sealing ends on thermoplastic panels or to create resiliently closeable passages in thermoplastic panels through which wires and other objects may be passed while maintaining an even surface appearance of the baseboard panel. Other uses include attaching one or more thermoplastic pieces together.

2. Background

The present invention pertains generally to the field of thermoplastic constructions such as those in office furnishings and equipment, hospital and clinic furnishings, cafeteria furnishings, office partitions, etc.

Office furnishings and equipment, and the like, are often put into service in environments where there is exposure to impact and abrasion, such as through heavy foot traffic, hand contact, or exposure to things in motion, such as dollies, carts, tables, chairs, wheelchairs, and hospital beds.

Office furnishings and equipment, and the like, are often provided with baseboards, railings, and other pieces to resist or absorb impacts and scuffing, as well as to present and maintain an even and neat appearance.

It is also often the case that such furnishings use trim pieces, and the like, to provide a continuous covering or finish. However, such pieces must be produced so as to be securely incorporated into the balance of the furnishing piece, such as along the top or bottom of office partitions. Accordingly, it is desirable to be able to produce a furnishing piece or panel capable of secure incorporation into a furnishing piece.

To achieve these ends, it is often desirable to be able to take advantage of two or more plastic materials having different flexion and appearance qualities by combining them into an integral part. This is complicated by the fact that attempts to incorporate different materials require a secondary adhesion operation involving specialized adhesives or the injection molding of different polymers under conditions that may not allow the two materials to sufficiently adhere that may mar the surface or other aesthetic qualities of the part, or both (such as through the application of heat or pressure, or both). To address these and other problems, the present invention provides a method of integrating dissimilar polymers to one another.

It is also often desirable to be able to produce plastic composites capable of being used as sight and/or light barriers, as well as to produce products that present and maintain desirable aesthetic qualities.

Also, in many instances, these pieces must be made to allow the passage of various electrical and signal transmissive wires, fiber optic cables, and the like, which are often necessary to operate office equipment such as, for example, telephones, computers, copiers, projectors, and lights.

To this end, panels normally have been provided with holes or gaps to allow wires and cables to be passed through. However, the various potential applications of baseboard panels, their arrangement, and their working environments make it difficult to predict where wire/cable access will be needed, and the size and number of wires or cables to be passed through at a given location.

One of the ways of constructing a gapped baseboard panel is to extrude a relatively rigid panel of material such as a rigid PVC. These panels are then cut to a desired length and a relatively flexible polymeric material, such as a flexible PVC material, is adhered to the relatively rigid material through use of an adhesive, such as a cyanoacrylate adhesive, in a secondary hand operation.

There are several problems attendant to the use of such adhesives in hand operations. One problem is that of ventilation. The adhered pieces must normally be carefully stacked to provide sufficient curing and ventilation. Also, in the case of cyanoacrylate adhesives, the vapor issuing from the curing adhesive can form a white deposit on the finished pieces, often rendering them unacceptable to the manufacturing customer. Naturally, any gaseous emissions from curing adhesive may pose a health hazard to the operator.

The use of liquid adhesives in hand operations are also inefficient. Liquid adhesive can be spilled, requiring cleanup, and hand operations, even when carefully done, can lead to gaps in the alignment between the rigid and flexible portions. It is therefore more difficult to manufacture such pieces within required tolerances.

Finally, the use of liquid in hand operations must rely upon the operator to dispense the appropriate amount of adhesive uniformly to be sure that a strong bond is achieved. This is often difficult to do efficiently in repetitive operations.

Accordingly, it is desirable to be able to produce a baseboard panel which can accommodate, alternatively, the throughput of a small or great number of wires (or wires of a small or great diameter) or remain unused, while maintaining an even appearance and without the use of separable parts.

It is also desirable to be able to produce such a furnishing panel in a continuous process without the need for secondary, post-extrusion operations (that is, a piece or panel that can be produced in a continuous in-line process).

The present invention also produces a furnishing panel with a strong and uniform bond across the interface between the rigid and flexible portions, while eliminating the environmental hazards, inefficiencies and product objections discussed above.

Also, the present invention provides an aperture covering for a piece or panel which is durable and resists the impact and flexion often occurring in high traffic environments, and the like.

In view of the present disclosure and/or through practice of the present invention, other advantages and the solutions to other problems may become apparent.

SUMMARY OF THE INVENTION

The present invention is a method of applying a relatively flexible polymeric material onto a surface of a relatively less flexible material, typically both thermoplastic materials. As used herein, the term "relatively flexible" may include, for instance, comparative references to the flexibility as between rigid and semi-rigid materials, rigid and flexible materials, semi-rigid materials and flexible materials, etc. In this regard, the relatively flexible materials may include ethyl vinyl acetate (EVA), urethanes (such as thermoplastic polyurethanes), PVC-urethane alloys (such as those commercially available from Alpha Chemical & Plastics Corporation), alloyed vinyls, thermoplastic rubbers (TPRs), and polyester elastomers, such as Hytrel® commercially available from DuPont®. Most preferred is the polytetramethylene glycol ether type polyurethane elastomers, such as Pellethane®, commercially available from Dow Chemical Company, of which grade 2103-70A is preferred. Pellethane® was found to bond extremely well when injection molded onto a PVC substrate and gave adhesion across the length of the applied piece. The relatively more flexible polymeric material may be selected from the group consisting of those preferably having a Shore A hardness in the range of from about 60 to about 95 according to ASTM method D-2240, most preferably in the range of from about 70 to about 80 according to ASTM method D-2240.

The relatively rigid polymeric material may be any extrudable material, such as those selected from the group consisting of rigid or semi-rigid PVC. Such materials may have a Shore D hardness of at least 50 according to ASTM method D-785, preferably in the range of from about 50 to about 90 according to ASTM method D-785, preferably in the range of from about 78 to about 82 according to ASTM method D-785.

The method of the present invention also includes a method for sequentially attaching an injection molded portion onto each of a series of thermoplastic parts, described more fully herein.

The present invention also includes a part such as that made in accordance with the subject method. Such a part generally comprises: (1) a relatively rigid piece (which may be adapted to be attached to a furnishing piece; typically a thermoplastic material), having an application surface; and (2) a portion of a material (also typically a thermoplastic material), being relatively more flexible than the relatively rigid material, and injection molded onto the application surface of said rigid piece.

The present invention more specifically includes a polymeric extrudate member having at least one resiliently sealed gap, for use as a baseboard or trim piece and the like. The polymeric extrudate comprises: (1) a first extrusion half of a relatively rigid polymeric material (such as a polyvinylchloride material) having a substantially flat first surface having a first edge; and (2) a second extrusion half of a relatively rigid polymeric material (such as a polyvinylchloride material) having a substantially flat second surface having a second edge. The first and second extrusion halves are attached to one another so as to be positioned beside one another and aligned so that the first edge is aside the second edge forming a gap. The first and second halves have inner application surfaces and outer facing surfaces. These surfaces are to be attached to an injection molded sealing member of a relatively flexible material (such as a urethane material), which is relatively more flexible than the relatively rigid material, injection molded directly onto each of said first and second surfaces so as to form a resiliently closing cover over the gap. This arrangement allows the formation of a baseboard member, having a resiliently closing passage, once the first and second extrusion halves are positioned next to one another.

It is preferred that the polymeric extrudate be a semi-rigid or rigid material, preferably PVC, and most preferably having a Shore D hardness in the range of from about 78 to about 82. An example of such a material is PVC Formulation 87256, commercially available from Geon Corporation.

An example of a urethane material which may be used in accordance with the present invention, and which is preferred, is Pellethane®, commercially available from Dow Chemical. An example of an ethylene-vinyl acetate copolymer which may be used in accordance with the present invention is ELVAX®, commercially available from Dow Chemical.

The present invention also includes a polymeric extrudate member having a resilient attachment. Such a member in accordance with the present invention includes: (a) a first extrusion half of a relatively rigid polymeric material (such as a polyvinylchloride material), the first half having an attachment surface having an edge; (b) a resilient attachment member of a flexible material injection molded onto the attachment surface so that the attachment member extends beyond the edge of the attachment surface; and (c) a second extrusion half of a relatively rigid polymeric material such as polyvinylchloride materials), the second extrusion half and the attachment member adapted to engage one another whereby the first and second extrusion halves are held together so as to form an integral member.

The materials which may be used for the relatively rigid and relatively flexible portions may be as given above.

The present invention also includes a method of producing a polymeric extrudate member having a resiliently closing passage. The method of the present invention comprises a first step comprising the alignment of: (a) a first extrusion half of a relatively rigid material (such as a polyvinylchloride material) having a substantially flat first surface having a first edge; and (b) a second extrusion half of a polyvinylchloride material having a substantially flat second surface having a second edge; such that the first and second surfaces are positioned beside one another and aligned so that the first edge is aside the second edge so as to form a gap. The first and second surfaces define an application surface and an opposite facing surface. In the second step, sealing members of a relatively more flexible material are injection molded, respectively, directly onto each of the first and second application surfaces so as to form a panel or baseboard member having a resiliently closing passage, when the first and second panels are brought together to form a gap therebetween.

DESCRIPTION OF THE DRAWINGS

FIG. 6 is a top plan view of a thermoplastic panel designed for use as a top portion of an office partition in accordance with one embodiment of the present invention;

FIG. 6a is a perspective view of the underside of the thermoplastic panel shown in FIG. 6;

FIG. 7 is a sectioned perspective view of an office partition in accordance with another embodiment of the present invention;

DETAILED DESCRIPTION OF THE PREFERRED EMBODIMENTS

The following is a detailed description of the preferred embodiment of the proposed invention which is also considered to be the best mode.

Figure 1:
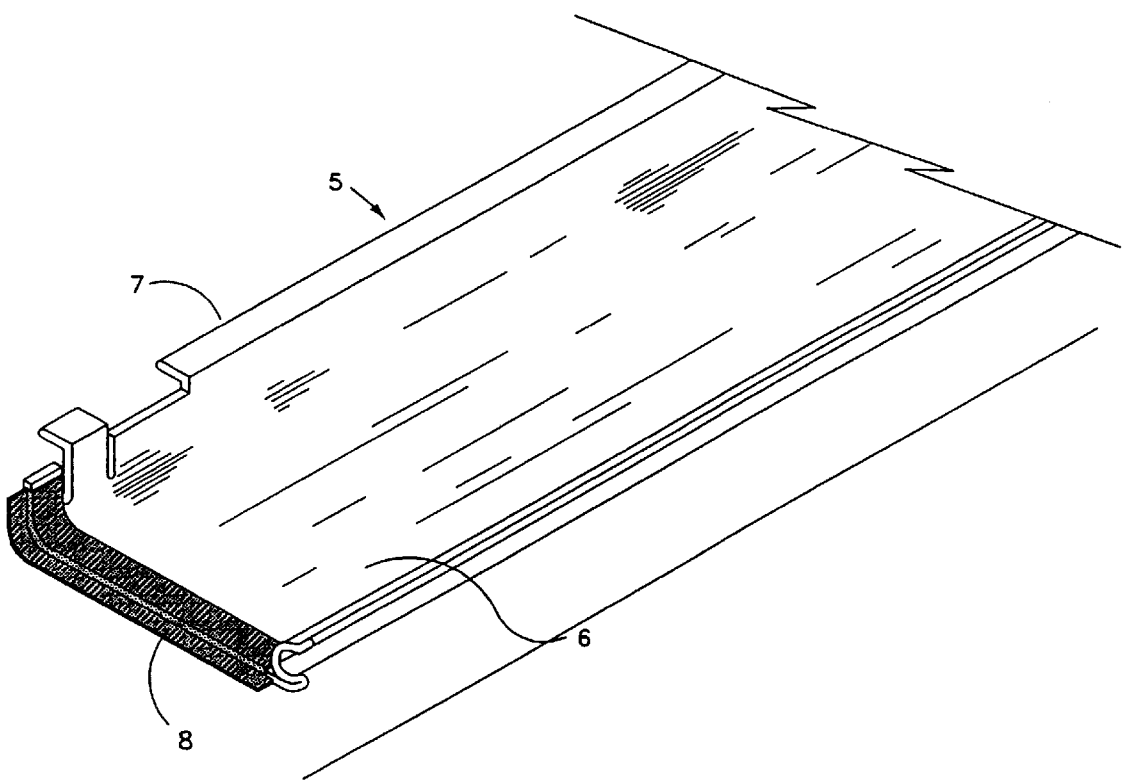
FIG. 1 is a sectioned perspective view of a thermoplastic panel designed for use as a baseboard panel of an office partition in accordance with one embodiment of the present invention.
Figure 2:
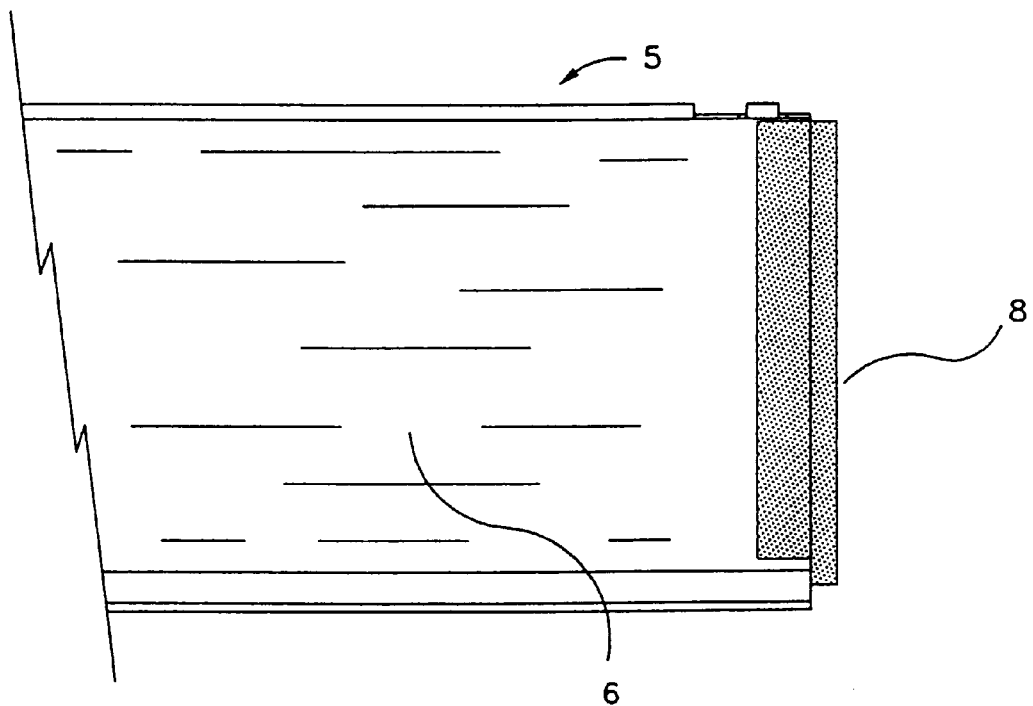
FIG. 2 is a sectioned elevational view of the reverse side of a thermoplastic panel designed for use as a baseboard panel of an office partition in accordance with one embodiment of the present invention.

FIG. 1 is a perspective view of a baseboard panel 5 in accordance with one embodiment of the present invention, showing the reverse or non-facing side 6 of polymeric panel portion 7. Polymeric panel portion 7 is preferable of a rigid or semi-rigid polyvinylchloride (PVC) material. Affixed to polymeric panel portion 7 is flexible extension piece 8 which is preferably injection molded onto surface 6 and is preferable of a urethane material. FIG. 2 shows a back view of baseboard panel 5 while FIG. 3 shows a front view of a baseboard panel 5 showing front or exposed surface 9.

Figure 3:
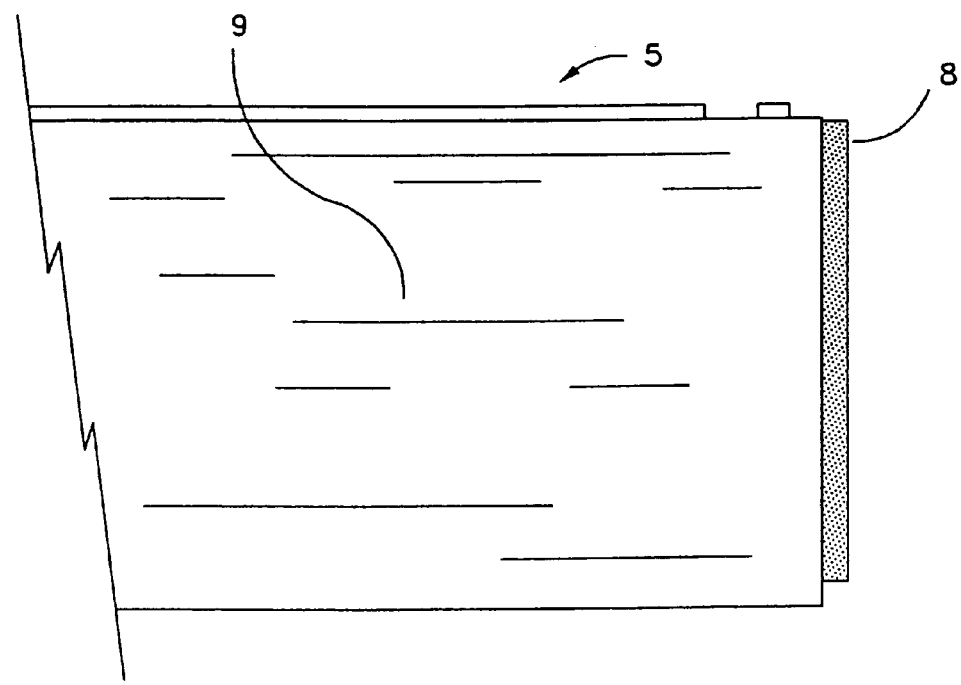
FIG. 3 is a sectioned elevational view of the facing side of a thermoplastic panel designed for use as a baseboard panel of an office partition in accordance with one embodiment of the present invention.

As can be appreciated from FIGS. 1–3, flexible extension piece 8 preferably has a cross-section with a very slight step-down which allows that portion of flexible extension piece 8 extending from polymeric panel portion 7 to be substantially flush with front surface 9.

Figure 4:
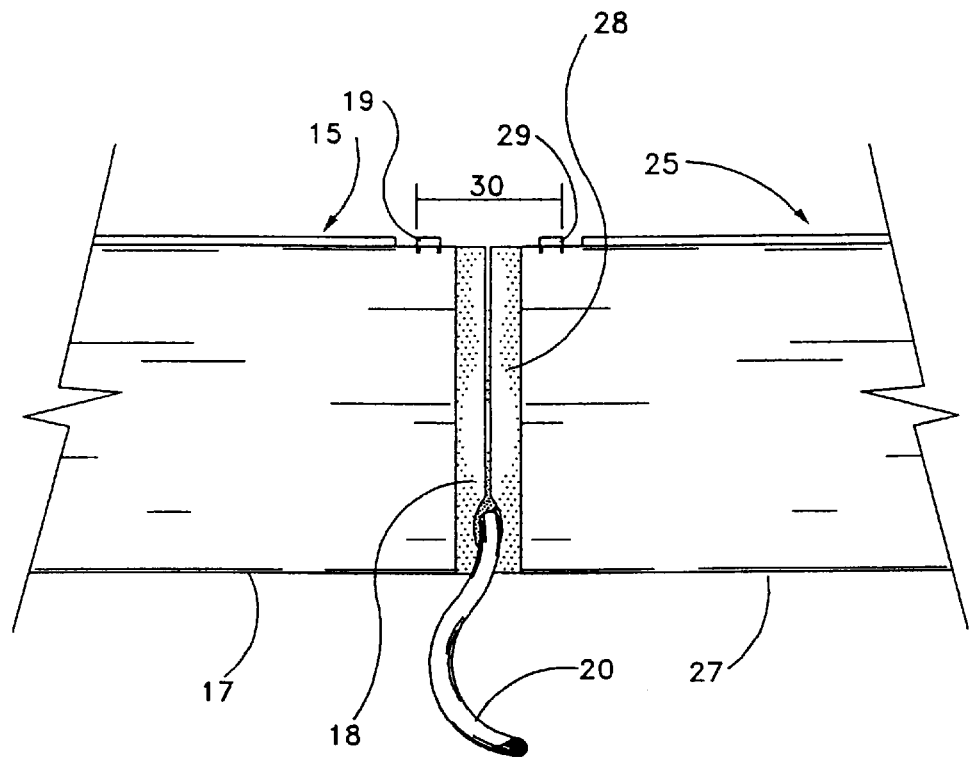
FIG. 4 is a sectioned elevational view of the facing side of two thermoplastic panels forming a portion of a baseboard panel of an office partition in accordance with one embodiment of the present invention.

FIG. 4 is a perspective view of two baseboard panels in accordance with one embodiment of the present invention, held at approximately 90 degrees to one another. Baseboard panel 15 comprises polymeric portion 17 and flexible extension portion 18. Baseboard panel 25 comprises polymeric panel portion 27 and flexible extension portion 28. Also shown are flexible attachment tabs 19 and 29 which are used to attach baseboard panels 15 and 25 along the bottom of, for instance, an office partition unit as shown in the environmental view of FIG. 5.

As can be seen in FIG. 4, baseboard panels 15 and 25 are attached in sufficiently close proximity to form a gap which is substantially covered by flexible extension pieces 18 and 28 (preferably overlapping). Flexible extension portions 18 and 28 thereby form a resiliently closeable passage through the baseboard made up of baseboard panels 15 and 25. As is also shown in FIG. 4, this allows for the passage through the baseboard of one or more wires, cables, tubes, or fiber optic cables, etc. An example is electrical wire 20 shown in FIG. 4. The gap formed between baseboard panels 15 and 25, i.e. gap 30, may be any appropriate width depending upon the intended application. For typical office applications, this gap may preferably be from about ½ inch to about 2 inches.

Figure 5:
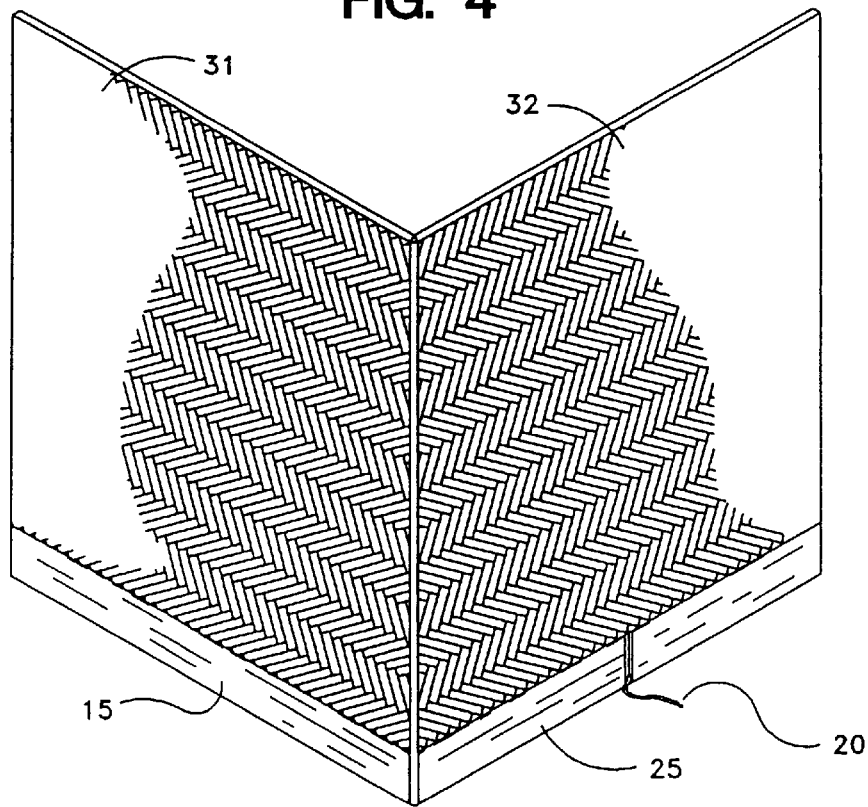
FIG. 5 is a perspective view of an office partition in accordance with one embodiment of the present invention.

FIG. 5 shows baseboard panels 15 and 25 affixed along the bottom of office partition panels 31 and 32, respectively.

To produce a baseboard panel such as is shown in FIGS. 1–3, a semi-rigid or rigid PVC material is extruded to form an appropriately sized and shaped profile which has a reverse and facing surface such as surfaces 6 and 9, respectively. As the polymeric panel portion is moved along to the end of the extruder line where it is cured, individual sections of the polymeric material are cut to the desired length. Typical of lengths for use in office applications may be in the range of from about ½ foot to about 8 feet.

The terminal end of the cut extrudate is then guided to a position where an injection mold is placed against reverse surface 6. Flexible extension portion 8 is then injection molded in place onto the terminal end of the polymeric panel 7. Once the leading edge of the first polymeric panel has been provided with a flexible extension portion, the next panel is moved into a position such that its leading edge, and the trailing edge of the first panel, can be provided with respective flexible extension portions simultaneously. This process can then be repeated for subsequent panels, making the injection molding process more efficient.

As an alternative, the extension portions may be injection molded in place by using an injection molding clamp such as Model WDH-35-S Vertical Clamp, Horizontal Injection, Insert Molding Machine, commercially available from Autojectors, Inc. of Albion, Ind.

FIG. 6 shows a top trim piece 42 for an office partition. Trim piece 42 comprises thermoplastic portion 40 and end sealing thermoplastic portion 44 injection molded onto surface 41 (see FIG. 6a) and extending therefrom. Thermoplastic portion 44 also has groove 43. FIG. 6a shows the underside 41 of thermoplastic portion 40 shown in FIG. 7.

FIG. 7 shows office partition 50 having wall portion 53 and top trim piece 42 shown sectioned so as to show the position of flexible portion 44 injection molded onto the underside thereof. Flexible portion 44 extends from top trim piece 42 so as to be able to engage side trim piece 45 (via groove 43) to form a trim perimeter and to help to hold the trim pieces together. By virtue of being flexible, portion 44 is able to engage side trim piece 45 by side trim piece 45 being slid vertically into place (note directional arrows in FIG. 7) so as to engage groove 43 in portion 44. This can be appreciated further by reference to FIG. 9 which shows side trim piece 45 having lip portion 46 which engages groove 43 when side trim piece 45 is slid vertically into place. The geometric arrangement of the panel shown in FIG. 7 is in accordance with that of office partitions known in the art.

As can be appreciated from the present disclosure, the panel and panel arrangements of the present invention may be used for any of a wide variety of uses, such as in baseboards, along the tops, sides and bottoms of office furniture, and even for household use. Producing panels and panel arrangements for a particular application will be a matter of selecting dimensions and shapes for the rigid and flexible portions, and is within the ability of one of ordinary skill in the art.

The present invention also includes a method of sequentially applying flexible polymeric portions to the surfaces at either end of a series of thermoplastic extrudate members each having lead and trailing edges and surfaces adjacent thereto. The method in broadest terms comprises the steps of: (a) aligning a first rigid thermoplastic extrudate member so as to position its leading edge in an injection mold cavity; (b) injection molding a flexible polymeric portion onto the surface of the first rigid extrudate member adjacent its leading edge; (c) transporting the first rigid thermoplastic extrudate member so as to position its trailing edge in the injection mold cavity and transporting a second thermoplastic extrudate member so as to position its leading edge in the injection mold cavity; (d) injection molding substantially simultaneously (1) a flexible polymeric portion onto the surface of the first rigid thermoplastic extrudate member adjacent its trailing edge, and (2) a flexible polymeric portion onto the surface of the second rigid thermoplastic extrudate member adjacent its leading edge; (e) transporting the first rigid thermoplastic extrudate member from the injection mold cavity, transporting the second rigid thermoplastic extrudate member so as to position its trailing edge in the injection mold cavity, and transporting a third rigid thermoplastic extrudate member so as to position its leading edge in the injection mold cavity; and (f) repeating steps (d) and (e) for subsequent rigid thermoplastic extrudate members beyond the third rigid thermoplastic extrudate member and beginning with the third rigid thermoplastic extrudate member.

Figure 8:
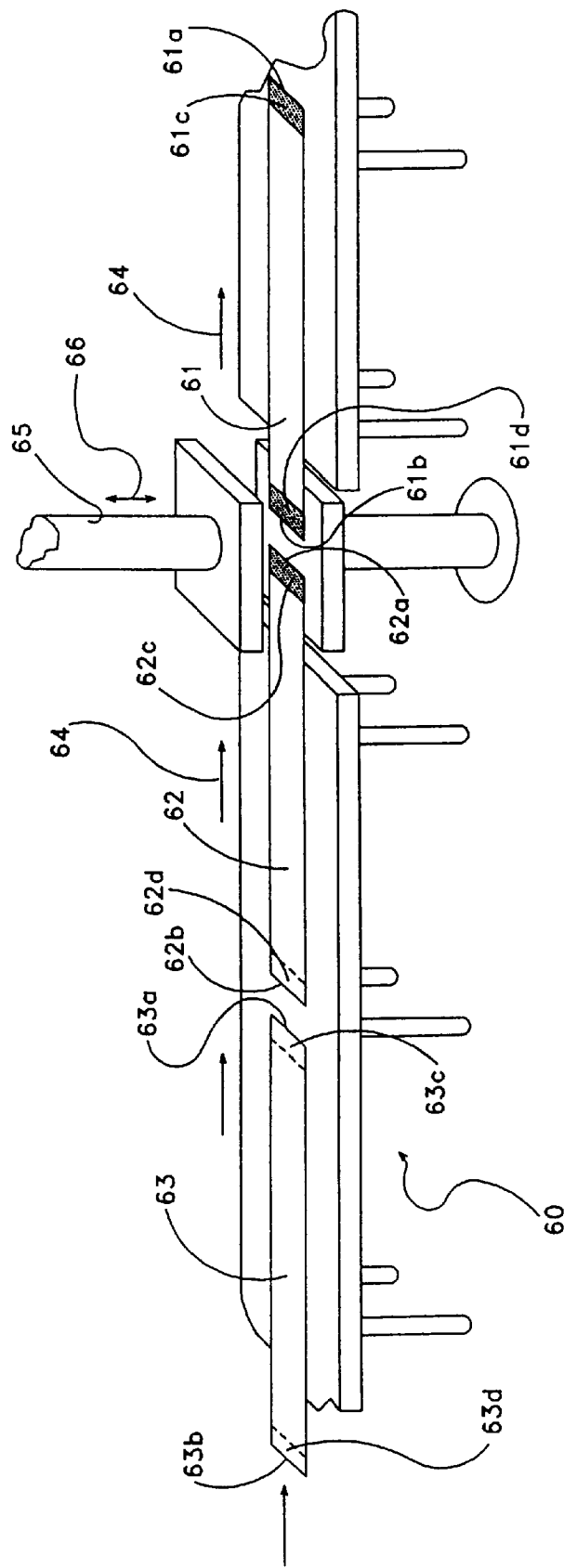
FIG. 8 is an apparatus used to perform the sequential attachment method of the present invention; and, FIG. 9 is a reverse side of a facia piece of office portion shown in FIG. 7.

FIG. 8 shows an apparatus used to perform the sequential attachment of the present invention. FIG. 8 shows the downstream end of an assembly line 60 (such as an extrusion line) adapted to support and transport a series of rigid thermoplastic polymeric pieces 61, 62, and 63. First rigid thermoplastic polymeric piece 61 has a leading edge 61a and adjacent surface (beneath injection molded portion 61c), and trailing edge 61b (beneath injection molded portion 61d). Second rigid thermoplastic polymeric piece 62 has a leading edge 62a with adjacent surface (beneath injection molded portion 62c), and trailing edge 62b with adjacent surface 62d. Third rigid thermoplastic polymeric piece 63 has a leading edge 63a and adjacent surface 63c, and trailing edge 63b with polymeric piece 63 has a leading edge 63a and adjacent surface 63c, and trailing edge 63b with adjacent surface 63d. The polymeric pieces are moved along the shown path in direction 64 and in sequential movements so as to first place leading edge 61a and its corresponding surface (beneath injection molded portion 61c) in the upstream side of mold cavity of injection mold 65 (which is adapted to place two injection molded portions, such as portion 8 of FIG. 1) onto each of two edge surfaces of respective adjacent polymeric pieces. After the mold is raised along direction 66, the next sequential movement transports first polymeric piece 61 to a position where its trailing edge 61b (beneath injection molded portion 61d) is disposed beneath the downstream side of mold cavity of injection mold 65 while second polymeric piece 62 is positioned such that its leading edge 62 (beneath already placed injection molded portion 62c) is in the upstream side of mold cavity of injection mold 65. Injection mold 65 is then able to place injection molded portions (such as 61d and 62c) simultaneously. The subsequent movements then place sequential sets of leading/trailing edges (and their adjacent surfaces), such as edge/surface 62b/62d and edge/surface 63a/63a into the mold cavity for subsequent application of injection molded portions in like-styled steps.

In light of the foregoing disclosure, it will be within the ability of one skilled in the extrusion and injection molding arts to make modifications to the present invention, such as through the substitution of equivalent materials and parts and the arrangement of parts, or the application of equivalent process steps, without departing from the spirit of the invention.

What is claimed is:

1. A method for applying a thermosetting polymeric portion to the surfaces at either end of a series of unconnected thermoplastic extrudate members each having lead and trailing edges and surfaces adjacent thereto, said method comprising the steps of:

(a) aligning a first thermoplastic extrudate member so as to position its leading edge in an injection mold cavity;

(b) injection molding a thermosetting polymeric portion onto said surface of said first thermoplastic extrudate member adjacent its leading edge;

(c) transporting said first thermoplastic extrudate member so as to position its trailing edge in said injection mold cavity, and transporting a second thermoplastic extrudate member so as to position its leading edge in said injection mold cavity;

(d) injection molding substantially simultaneously (1) a thermosetting polymeric portion onto said surface of said first thermoplastic extrudate member adjacent its trailing edge, and (2) a thermosetting polymeric portion onto said surface of said second thermoplastic extrudate member adjacent its leading edge wherein the first and second thermoplastic extrudate members remain unconnected to one another;

(e) transporting said first thermoplastic extrudate member from said injection mold cavity, transporting said second thermoplastic extrudate member so as to position its trailing edge in said injection mold cavity, and transporting a third thermoplastic extrudate member so as to position its leading edge in said injection mold cavity; and (f) repeating steps (d) and (e) for subsequent thermoplastic extrudate members beyond said third thermoplastic extrudate member.

2. A method of producing a series of polymeric extrudate members each having a flexible member attached to each end thereof, said method comprising the steps:

(a) aligning:
      (i) a first member of a polyvinylchloride material, said first member having a substantially flat first surface having a first trailing edge; and
      (ii) a second member of a polyvinylchloride material, said second member having a substantially flat second surface having a leading and trailing edge; whereby are first and second surfaces are positioned beside one another and aligned whereby said first trailing edge is aside said second leading edge in molding relationship with an injection molding cavity;

(b) injection molding a member of a thermosetting material, relatively more flexible than said polyvinylchloride material, onto, respectively: (i) said first surface and extending from said first trailing edge, and (ii) said second surface and extending from said second leading edge;

(c) advancing said first and second members so as to align:
      (i) said second member of a polyvinylchloride material; and
      (ii) a third member of a polyvinylchloride material, said third member having a substantially flat third surface having a leading and trailing edge; whereby are second and third surfaces are positioned beside one another and aligned whereby said second trailing edge is aside said third leading edge in molding relationship with said injection molding cavity;

(d) injection molding a member of a urethane material, relatively more flexible than said polyvinylchloride material, onto, respectively: (i) said second surface and extending from said second trailing edge, and (ii) said third surface and extending from said third leading edge; and (e) repeating steps (a) and (b) beginning first with said third member in the place of said first member in step (a) and fourth member in the place of said second member in step (a).

* * * * *